United States Patent [19]

Fock et al.

[11] Patent Number: 4,476,038

[45] Date of Patent: Oct. 9, 1984

[54] COMPOSITION FOR PREVENTING OR ELIMINATING FOAM, ESPECIALLY IN AQUEOUS SYSTEMS

[75] Inventors: Jürgen Fock, Düsseldorf; Hans-Ferdi Fink, Essen, both of Fed. Rep. of Germany

[73] Assignee: Th. Goldschmidt AG, Fed. Rep. of Germany

[21] Appl. No.: 448,687

[22] Filed: Dec. 10, 1982

[30] Foreign Application Priority Data

Jan. 20, 1982 [DE] Fed. Rep. of Germany ....... 3201479

[51] Int. Cl.$^3$ .................... B01D 19/04; C07C 43/11
[52] U.S. Cl. ............................ 252/358; 252/321; 252/174.21; 252/52 A; 568/624; 568/625
[58] Field of Search ................... 252/358, 321, 174.21, 252/52 A; 568/624, 625, 617

[56] References Cited

U.S. PATENT DOCUMENTS

| | | | |
|---|---|---|---|
| 4,042,528 | 8/1977 | Abe | 252/358 |
| 4,280,919 | 7/1981 | Stoeckigt et al. | 252/174.21 |
| 4,303,544 | 12/1981 | Kosswig et al. | 252/358 |
| 4,317,740 | 3/1982 | Eisenhard | 252/52 A |
| 4,332,696 | 6/1982 | Slovinsky et al. | 252/321 |

*Primary Examiner*—Richard D. Lovering
*Assistant Examiner*—Anne Brookes

*Attorney, Agent, or Firm*—Toren, McGeady and Stanger

[57] ABSTRACT

The invention relates to a defoaming agent. The active compounds having the formula

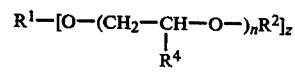

wherein
z = a whole number from 1 to 3;
$R^1$ = a hydrocarbon radical having a functionality of z, and when z is 1, a hydrogen radical;
$R^2$ = hydrogen, alkyl, aryl, —CONHR$^3$,

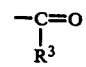

or a —SiR$_3{}^3$ radical, in which at most 100/z % of all $R^2$ radicals may be hydrogen radicals;
$R^3$ = a monofunctional hydrocarbon radical;
$R^4$ = a linear alkyl radical with an average of 4 to 16 carbon atoms, a methyl, or hydrogen radical, in which case, however, no more than 90 mole percent of the $R^4$ radicals may be methyl or hydrogen radicals; and
n = is a whole number not less than 2.

16 Claims, No Drawings

COMPOSITION FOR PREVENTING OR ELIMINATING FOAM, ESPECIALLY IN AQUEOUS SYSTEMS

BACKGROUND OF THE INVENTION

1. Field of the Invention

The invention relates to an agent for preventing or eliminating foam, especially in aqueous systems, for which a defoaming agent is dissolved or dispersed in organic solvents or diluents, which optionally contain water, and which additionally may contain finely particulate, optionally hydrophobized, silica.

2. Description of the Prior Art

It is well known that polyoxyalkylene monools or diols or their ethers exhibit foam-preventing or foam-eliminating properties in aqueous systems when they are insoluble in these systems. As a rule, the monools or diols of polyaddition products of ethylene oxide and propylene oxide have been used for this purpose. Polyaddition products which contain oxyethylene units exclusively, develop their defoaming action at or after exceeding their cloud point in aqueous solution.

It is furthermore known that vegetable or mineral oils or silicone oils have defoaming activity. Copolymers of polyoxyalkylene and polysiloxane blocks have also been prepared and used to increase the defoaming properties. Especially preferred in this connection are block copolymers whose polyoxyalkylene block contains at least 80 weight percent of oxypropylene units. Such a preparation is described, for example, in German Auslegeschrift No. 24 43 853. The defoaming effectiveness of this preparation can be increased even further by the addition of highly dispersed silica which is prepared, for example, by flame hydrolysis.

German Pat. No. 23 45 335 describes a defoamer for aqueous solutions or dispersions which contains 80 to 95 weight percent of a mineral oil or vegetable or animal oil, 1 to 7.5 weight percent of highly dispersed silica or highly dispersed aluminum oxide, 1.0 to 10 weight percent of a methylpolysiloxane-polyoxyalkylene block copolymer, whose methylpolysiloxane block constitutes 10 to 60 weight percent of the polymer and whose polyoxyalkylene block has 80 to 100 weight percent of oxypropylene units.

SUMMARY OF THE INVENTION

We have discovered an agent with an even higher foam-preventing or foam-eliminating activity than the above-described agent. Particularly, we have found that certain polyoxyalkylene compounds having long, aliphatic side chains are particularly effective defoamers if they meet certain conditions.

The objective of the present invention is therefore an agent for preventing or eliminating foam which contains as an effective amount of an active defoaming ingredient, compounds having the general formula:

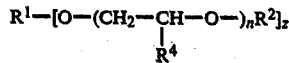

wherein
z = a whole number from 1 to 3;
$R^1$ = a hydrocarbon radical having a functionality of z, and when z is 1, a hydrogen radical;
$R^2$ = hydrogen, alkyl, aryl, —$CONHR^3$,

or a —$SiR_3^3$ radical, in which at most (100/z)% of all $R^2$ radicals may be hydrogen radicals;
$R^3$ = a monofunctional hydrocarbon radical;
$R^4$ = a linear alkyl radical with an average of 4 to 16 carbon atoms, a methyl, or hydrogen radical, in which case, however, no more than 90 mole percent of the $R^4$ radicals may be methyl or hydrogen radicals; and
n = is a whole number not less than 2.

DESCRIPTION OF THE PREFERRED EMBODIMENT

The $R^1$ radical is a hydrogen or a hydrocarbon radical, having a functionality of z, so that it can be monofunctional to trifunctional. If z=1, $R^1$ is a hydrogen radical or a monofunctional hydrocarbon radical, in which case it preferably represents an alkyl or an aryl radical. As the alkyl radical, a lower alkyl radical with 1 to 3 carbon atoms, such as, the methyl, ethyl, propyl and isopropyl radical is especially preferred. The phenyl radical is the preferred aryl radical. The alkyl radical, as well as the aryl radical, may optionally be substituted. An example of a substituted alkyl radical is the benzyl radical and an example of a substituted aryl radical is an alkylaryl radical, such as, the nonylphenyl or the dodecylphenyl radical.

If z=2, $R^1$ is a bifunctional hydrocarbon radical, especially an alkylene radical with preferably 2 to 6 carbon atoms, such as, the ethylene, propylene, butylene, isobutylene or hexylene radical.

If z has a value of 3, $R^1$ is a trifunctional hydrocarbon radical, which preferably has at least 3 carbon atoms. Especially preferred is the

radical, which is derived from glycerin.
Preferably z has a value of 1.

$R^2$ is a terminal radical at the end of the polyoxyalkylene chains. It may represent an alkyl or an aryl radical with lower alkyl radicals with 1 to 3 carbon atoms being preferred. If $R^2$ represents an aryl radical, the phenyl radical is preferred. The alkyl or aryl radicals may also be substituted in the same manner as shown for $R^1$.

The $R^2$ radicals may furthermore represent a —$CONHR^3$,

or —$SiR_3^3$ radical.

The —$CONHR^3$ end groups are formed by reacting the terminal hydroxyl group, formed during the polymerization, with a monoisocyanate. An example of such a monoisocyanate is an alkyl isocyanate, such as, n-butyl isocyanate, or phenyl isocyanate. $R^3$, accordingly, represents a hydrocarbon radical, especially an alkyl or aryl radical, a lower alkyl radical with 1 to 6 carbon atoms being particularly preferred. It is clear to those skilled in the art that two molecules of formula I can be linked together by using a diisocyanate.

If the terminal hydroxyl groups(s) is (are) esterified with carboxylic acids or their anhydrides or acid chlorides, the terminal

group is obtained, in which the $R^3$ radical once again is a hydrocarbon radical, which corresponds to the carboxylic acid or the derivative of the carboxylic acid.

The terminal hydroxyl group(s) can moreover be blocked with $Cl—SiR_3{}^3$. In this case, $R^3$ is usually a methyl radical.

The $R^2$ radical can also represent a hydrogen radical, with the proviso, however, that not more than $(100/z)\%$ of all the $R^2$ radicals can be hydrogen radicals. However, the best defoaming results are obtained with preparations in which all terminal hydroxyl groups are blocked. The $R^2$ radicals within the polymer mixture may be the same or they may be different.

$R^4$ is a linear, saturated alkyl radical which, on the average, has 4 to 16 carbon atoms, or it is a methyl or hydrogen radical. However, the possibility that $R^4$ is a methyl or hydrogen radical is limited by the fact that not more than 90 mole percent of the $R^4$ radicals can be methyl or hydrogen radicals. The oxyalkylene units, in which $R^4$ is a methyl radical, are oxypropylene units. If $R^4$ is a hydrogen radical, the polymer contains oxyethylene units. These may, however, be contained in only a limited amount, so that the compounds are not soluble in water. The maximum content of oxyethylene units therefore depends on the content of units in which $R^4$ represents longer chain radicals or methyl radicals. In general, the polymer which is to be used inventively, has no oxyethylene groups or only a small amount. A larger proportion of oxyethylene units is tolerable only when the medium to be defoamed has a temperature above the cloud point of the active substance.

The definition that $R^4$ is a linear alkyl radical with an average of 4 to 16 carbon atoms, means that the chain length of the $R^4$ radical within the polymer can be variable. The number of carbon atoms of all alkyl side chains with more than one carbon atom, divided by the number of these side chains, must result in a number which lies between 4 and 16. Obviously, it is also possible to synthesize the polymer uniformly with respect to the longer chain alkyl radicals and to employ, for example, such oxyalkylene units that those $R^4$ radicals, which represent a linear alkyl radical, have, for example, 4 or 6 or 10 carbon atoms. However, those compounds in which the $R^4$ radical is a mixture of radicals with 8 to 12 carbon atoms, have proven to be particularly advantageous in the present invention. Particularly preferred are compounds of formula I in which the $R^4$ radical consists of at least 50% of linear alkyl radicals with 4 to 12 carbon atoms and, preferably, with 8 to 12 carbon atoms.

n is a whole number, which is not less than 2. Preferably, n is greater than 5 and most preferably, 10 to 30.

As already mentioned above, z is a whole number from 1 to 3. Preferably, z has a value of 1 or 2.

Examples of the inventive foam-preventing or foam-eliminating active compounds in accordance with the present invention are:

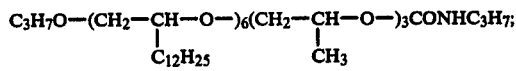

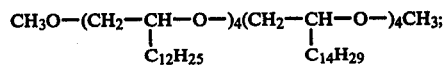

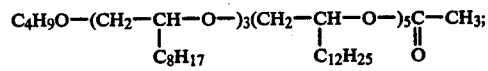

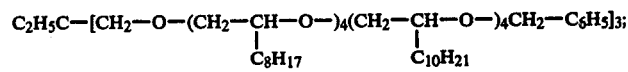

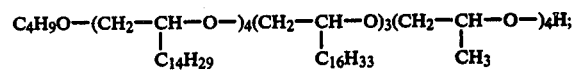

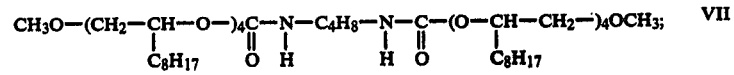

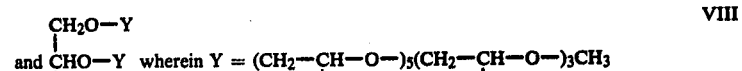

The compounds of the formula shown in claim 1 can be synthesized by known methods by the addition of alkylene oxides to multihydric starting alcohols having a functionality of z, having the formula $R^1(OH)_z$. As starting alcohol, for example, methanol, ethanol, propanol, butanol, dodecanol, phenol, dodecylphenol, benzyl alcohol, ethylene glycol, propylene glycol or glycerin may be used depending on the functionality of the starting alcohol and the meaning of the R radical. As shown above, the terminal hydroxyl groups can then be reacted with isocyanates, carboxylic acids or their derivatives, or halogentrihydrocarbonsilanes.

As alkylene oxides, $\alpha$-olefin oxides with 6 to 18 carbon atoms and their mixtures may be used. These can be added to homopolymers. Such polymerization processes are described, for example, in U.S. Pat. No.

2,987,489, and in the "Bulletin of the Japan Petroleum Institute" (1965), pages 25 to 30.

If $R^4$ is a methyl or hydrogen radical, it is possible to mix propylene oxide or ethylene oxide with the α-olefin oxides and to allow this mixture to react. The distribution of the polymers obtained then depends on the reactivity of the individual expoxides. It is, of course, possible to add a portion of the longer-chain α-olefin oxides initially to a block and to add propylene oxide to this, and, if necessary, form additional blocks once again. There is, however, reason to believe that the simultaneous polymerization of a mixture of the individual alkylene oxides leads to better defoaming results.

Depending on the content of longer chain oxyalkylene groups and the molecular weight, the compounds of formula I are liquid to pasty to wax-like compounds. They can be processed into finely particulate dispersions in nonpolar organic solvents, such as, for example, toluene, or in polar organic solvents, such as, for example, the lower alcohols, such as, isopropanol. It is also possible to employ mixtures of solvents, those solvents or mixtures being preferred in which the active substances are finely dispersed. This fine dispersal is promoted by using appropriate stirring, dispersing, or homogenizing equipment.

Finely divided silica may optionally be added to these preparations. In particular, silica obtained by flame pyrolysis, whose surface is hydrophobized totally or partially by known methods, is used for this purpose. The use of silica in amounts up to the weight of the active ingredient is especially preferred. Excellent results are also achieved by small additions, for example, by the addition of 5% by weight, based on the active ingredient.

Preparations in accordance with the present invention may have the compositions:

TABLE 1

| Active Ingredient | | Solvent | | Silica | Water |
|---|---|---|---|---|---|
| Formula | Amount (g) | Type | Amount (g) | (g) | (g) |
| II | 40 | toluene | 60 | — | — |
| II | 30 | toluene | 60 | 10 | — |
| IV | 50 | toluene/i-propanol 1:1 parts by vol. | 45 | 5 | — |
| IV | 30 | toluene/i-propanol 1:1 parts by vol. | 30 | 10 | 30 |
| III | 40 | toluene | 30 | 30 | — |
| V | 20 | toluene/i-propanol 1:2 parts by vol. | 20 | 20 | 40 |
| VII | 60 | toluene | 30 | 10 | — |

The preparations are added to the medium to be defoamed in amounts such that the medium contains from about 10 to 200 ppm of active ingredient. The defoaming action is usually observed at the lower end of the range given, that is, on the addition of 10 to 100 ppm. Aqueous solutions of ionic and nonionic surfactants, aqueous dispersions of polymers, mineral oils and their emulsions, and fermentation liquors can be defoamed particularly successfully with the preparations of the present invention.

The non-inventive synthesis of the compounds of Formula I is shown first in the following examples. The preparation of the defoaming compositions is then described and their effectiveness in respect to the prevention and elimination of foam is determined by standardized methods of measurement.

EXAMPLE 1

(A) Synthesis of a Poly(α-Olefin Oxide)

n-Butanol (74 g, approx. 1 mole) and 10.5 g (approx. 0.15 mole) of potassium methylate are dispersed in 1966 g of an α-olefin oxide mixture of 1106 g (approx. 6 moles) of 1-dodecene oxide and 860 g (approx. 4 moles) of 1-tetradecene oxide. The mixture is heated with stirring and under a blanket of nitrogen to 140° C. After a reaction period of 4 hours, the conversion is determined to be 67% on the basis of the epoxide number. After the stepwise addition of 1 g of potassium methylate over 11 hours, during which a total of 5 g of the alcoholate is added, a conversion of 91% is attained at 140° C. A further 9 hours of reaction time are required at 140° C. in order to attain a conversion of 98% of the theoretical. Overall, the reaction required 24 hours.

After neutralization with 30% aqueous phosphoric acid, removal of the water under vacuum and filtration of the salt formed with the help of a filter aid, a light-yellow, slightly wax-like, viscous product is obtained. The hydroxyl number is 51.9, which corresponds to a molecular weight of 1080 if a functionality of 1 is assumed.

(B) Testing of the Material

A solution of 9.5 g of the product obtained in 1(A) in 10 g of toluene is prepared, to which 0.5 g of a hydrophobized silica (SIPERNAT® D 17) and 10 g of isopropyl alcohol are added. The suspension obtained is dispersed in 10 g of de-ionized water with the help of a Mizer disk for 2 minutes at 1750 rpm.

With the help of a medical syringe, 60 ppm of the suspension obtained are added to 1 l of a 0.1% aqueous solution of a surfactant of 2 parts by weight of the sodium salt of the alkylbenzenesulfonic acid and 1 part by weight of an ethoxylated nonylphenol (MERPILAN® E). A foam volume of approximately 1 l had been produced above this solution by introducing a stream of air through a fritted glass disk. The foam collapses within a few seconds. A foam volume of 1 l is attained again only after the introduction of air is continued for a further 18 minutes.

EXAMPLE 2

Synthesis of Poly(α-Olefin Oxides) from Two α-Olefin Oxides with 8 to 14 Carbon Atoms and Testing the Material The procedure of Example 1 is followed. However, mixtures of two α-olefin oxides with different numbers of carbon atoms ($C_A/C_B$) are polymerized in the molar ratio of 1:1 (see table). The amounts of α-olefin oxides used are calculated on the basis of a theoretical molecular weight of 1350, the amount of n-butanol being 74 g (approx. 1 mole) in each case. The table gives the weights of α-olefin oxide monomers used with the carbon numbers of $C_A$ and $C_B$. The total amount of potassium methylate used is 17.5 g (ca. 0.25 moles), ⅔ of this amount being added at the start and ⅓, divided over a reaction period of 12 hours, being added 6 hours after the reaction commenced.

The times t required for obtaining a foam volume of 1 l, as described in Example 1(B), are given in the last column of Table 2.

TABLE 2

| $C_A/C_B$ | $C_A(g)$ | $C_B(g)$ | OH No. | M | t (min) |
|---|---|---|---|---|---|
| 14/10 | 735 | 541 | 52.4 | 1070 | 21 |
| 14/8 | 795 | 481 | 51.5 | 1090 | 22 |
| 12/10 | 690 | 586 | 50.1 | 1120 | 24 |
| 12/8 | 752 | 523 | 48.3 | 1160 | 30 |
| 10/8 | 702 | 574 | 48.8 | 1150 | 27 |

EXAMPLE 3

Synthesis of Poly(α-Olefin Oxides) from Two α-Olefin Oxides with 12 and 14 Carbon Atoms with Copolymerization of Propylene Oxide and Testing the Material n-Butanol (74 g, approx. 1 mole) and 10.5 g (approx. 0.15 moles) of potassium methylate are added to 366 g of an α-olefin oxide mixture of 205 g (approx. 1.1 moles) of 1-dodecene oxide and 161 g (approx. 0.8 moles) 1-tetradecene oxide in a reactor with a forced circulation system and an additional stirrer. After flushing carefully with nitrogen, the temperature is raised to 130° C. Then, a mixture of 550 g (approx. 9.5 moles) of propylene oxide, 7 g (approx. 0.1 moles) of potassium methylate and 734 g of a mixture of 411 g (approx. 2.2 moles) of 1-dodecene oxide, and 323 g (approx. 1.5 moles) of 1-tetradecene oxide are added in increments of 20 g, in such a manner that, on the one hand, the temperature and pressure within the reactor do not exceed 130° C. and 3 bar, respectively and, at the same time, the monomers added can react out after each addition, as can be seen by the decrease in pressure to normal pressure. The time required for the stepwise addition is 9 hours. The reaction conditions are then maintained for an additional 8 hours.

The conversion determined from the epoxide number is 97% of the theoretical. After neutralizing with 30% phosphoric acid, removing the water under vacuum and filtering off the salt formed with the help of a filter aid, a yellowish, viscous product is obtained. The hydroxyl number is 47.5 and corresponds to a molecular weight of 1180, if the functionality is assumed to be 1.

A time of 20 minutes is required to obtain a foam volume as described in Example 1(B).

EXAMPLE 4

Synthesis of Poly(α-Olefin Oxides) from Two α-Olefin Oxides with 16 and 18 Carbon Atoms with Copolymerization of Propylene Oxide n-Butanol (74 g, approx. 1 mole) and 10.5 g. (approx. 0.15 moles) of potassium methylate are added to 553 g of an α-olefin mixture of 312 g (approx. 1.3 moles) of 1-hexadecene oxide and 241 g (approx. 0.9 moles) of 1-octadecene oxide in a reactor with a forced circulation system and an additional stirrer. After carefully flushing with nitrogen, the temperature is raised to 130° C. and a mixture of 232 g (approx. 4 moles) of propylene oxide, 7 g (approx. 0.1 moles) of potassium methylate and 1130 g of a mixture of 648 g (approx. 2.7 moles) of 1-hexadecene oxide and 482 g (approx. 1.8 moles) of 1-octadecene oxide is added in steps of 20 g in such a manner that, on the one hand, the temperature and pressure within the reactor do not exceed 130° C. and 3 bar, respectively, and, at the same time, the monomers added are allowed to react out after each addition, as can be seen by the decrease in pressure to normal pressure. The time required for the stepwise addition is 9 hours. The reaction conditions are then maintained for an additional 8 hours.

The conversion determined from the epoxide number is 98% of the theoretical. After neutralizing with 30% phosphoric acid, removing the water under vacuum and filtering off the salt formed with the help of a filter aid, a yellowish viscous product is obtained. The hydroxyl number is 38.2 and corresponds to a molecular weight of 1469, if the functionality is assumed to be 1.

A time of 28 minutes is required in order to obtain a foam volume as described in Example 1(B).

We claim:

1. A defoaming composition which comprises a defoaming effective amount of a water insoluble compound having the formula

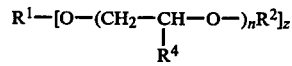

wherein
z = a whole number from 1 to 3;
R$^1$ = a hydrocarbon radical having a functionality of z, and when z is 1, a hydrogen radical;
R$^2$ = hydrogen, alkyl, aryl, —CONHR$^3$,

or a —SiR$_3^3$ radical, in which at most (100/z)% of all R$^2$ radicals may be hydrogen radicals;
R$^3$ = a monofunctional hydrocarbon radical;
R$^4$ = a linear alkyl radical with an average of 4 to 16 carbon atoms, or methyl, in which case, however, no more than 90 mole percent of the R$^4$ radicals are methyl; and
n = is a whole number not less than 2,
said compound being dissolved or dispersed in an organic solvent or diluent.

2. The composition of claim 1 which further contains water.

3. The composition of claim 1 which further contains finely particulate silica.

4. The composition of claim 3 wherein the silica is hydrophobized.

5. The composition of claim 1, 2 or 3, wherein at least 50% of the R$^4$ radicals are linear alkyl radicals with an average of 4 to 12 carbon atoms.

6. The composition of claim 1, 2 or 3, wherein at least 50% of the R$^4$ radicals are linear alkyl radicals with an average of 8 to 12 carbon atoms.

7. The composition of claim 1, 2 or 3, wherein z is 1 or 2.

8. The composition of claim 1, 2 or 3, wherein R$^1$ is a z-functional alkyl radical with up to 6 carbon atoms.

9. The composition of claim 1, 2 or 3, wherein z is 1 and R$^1$ is an alkyl radical with 1 to 3 carbon atoms.

10. The composition of claim 1, 2 or 3, wherein finely particulate silica is present in an amount equal to the weight of the compound.

11. A water insoluble compound having defoaming properties having the formula

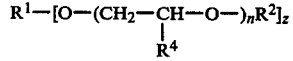

wherein
z = a whole number from 1 to 3;
$R^1$ = a hydrocarbon radical having a functionality of z, and when z is 1, a hydrogen radical;
$R^2$ = hydrogen, alkyl, aryl, —CONHR³,

or a —SiR₃³ radical, in which at most (100/z)% of all $R^2$ radicals may be hydrogen radicals;
$R^3$ = a monofunctional hydrocarbon radical;
$R^4$ = a linear alkyl radical with an average of 4 to 16 carbon atoms, or methyl, in which case, however, no more than 90 mole percent of the $R^4$ radicals may be methyl; and
n = is a whole number not less than 2.

12. The compound of claim 11 wherein at least 50% of the $R^4$ radicals are linear alkyl radicals with an average of 4 to 12 carbon atoms.

13. The compound of claim 11 wherein at least 50% of the $R^4$ radicals are linear alkyl radicals with an average of 8 to 12 carbon atoms.

14. The compound of claim 11 wherein z is 1 or 2.

15. The compound of claim 11 wherein $R^1$ is a z-functional alkyl radical with up to 5 carbon atoms.

16. The compound of claim 11 wherein z=1 and $R^1$ is an alkyl radical with 1 to 3 carbon atoms.

* * * * *